(12) United States Patent
Demulder et al.

(10) Patent No.: US 8,495,956 B1
(45) Date of Patent: Jul. 30, 2013

(54) TWINE TENSIONING SYSTEM FOR A BALER

(71) Applicant: Deere & Company, Moline, IL (US)

(72) Inventors: Carl F. Demulder, Ottumwa, IA (US);
Alan Lugert, Ottumwa, IA (US)

(73) Assignee: Deere & Company, One John Deere Place, Moline, IL (US)

( * ) Notice: Subject to any disclaimer, the term of this patent is extended or adjusted under 35 U.S.C. 154(b) by 0 days.

(21) Appl. No.: 13/663,524

(22) Filed: Oct. 30, 2012

(51) Int. Cl.
B65B 13/22 (2006.01)

(52) U.S. Cl.
USPC .......................................... 100/32; 100/33 R

(58) Field of Classification Search
USPC .......... 100/3, 17, 18, 19 R, 32, 33 R; 56/341, 56/343; 289/2, 18.1
See application file for complete search history.

(56) References Cited

U.S. PATENT DOCUMENTS

| | | | | |
|---|---|---|---|---|
| 4,108,062 A | * | 8/1978 | White | 100/11 |
| 4,753,464 A | * | 6/1988 | Jackson | 289/2 |
| 4,765,235 A | * | 8/1988 | Schrag et al. | 100/3 |
| 5,988,053 A | * | 11/1999 | Leupe et al. | 100/3 |

* cited by examiner

Primary Examiner — Jimmy T Nguyen

(57) ABSTRACT

A twine tensioning system for a baler in which adjacent lengths of upper and lower twine lengths are knotted and passed around a bale that is being compressed in a baler. Knots are formed to connect twine at the forward and rearward end of the bales. A slack arm maintains tension during the process of knotting and severing the twines and a stop bar is removably positioned to provide a lower stop for the slack arm when the bales are being passed through the system to minimize wear.

10 Claims, 2 Drawing Sheets

TWINE TENSIONING SYSTEM FOR A BALER

FIELD OF THE INVENTION

The present invention relates to crop balers, and, more particularly, to tensioning systems used to tie the bales as a crop is harvested.

BACKGROUND OF THE INVENTION

It has long been known that in rectangular balers, severed crop material is picked up off the ground and packed into fakes and then fed into the path of a plunger. It is then fed into a baling chamber in which succeeding flakes of crop material are compressed and pushed through the chamber to produce a bale having dimensions that are set by the cress section of the baling chamber and by appropriate length controlling mechanisms. The flakes making up the hales are tied with one or more circumferential lengths of twine to keep the hale together after the bale is ejected from the bale forming chamber. Typically, a plurality of strands of twine are passed around laterally spaced portions of the hale according to the size of the chamber. The baling twine tensioning systems have developed over the years and generally are formed with an upper and lower twine supply which is fed to a system for tying knot between two lengths of twine at the beginning and the end of the bale. Over the years, these systems have been developed so that the correct amount of tension is provided, to securely hold the bale together. One of the key elements in such a system is a slack arm which takes up the slack during the knotting process. Previous systems have provided a torturous path around one of the pivotal shafts for mechanism involved in the knotting and twine severing operation. Such a path has resulted in long term issues with respect to twine life.

What is needed in the art therefore is a system in which the twine path in a tensioning system provides minimal wear to the twine.

SUMMARY

A twine tensioning system is provided for a baler which includes a housing, a twine bin, and a tensioner through which twine is fed. A slack arm is pivotally mounted in the housing with the slack arm having a guide at an end remote from the pivotal connection for guiding twine. A knot tying and twine severing apparatus is positioned adjacent the remote end of the slack arm. A tucker finger is positioned below the knot tying and twine severing apparatus and is pivotally mounted on a tucker finger shaft for periodically displacing twine into the knot tying and twine severing apparatus. The slack arm is pivotally mounted to the housing above the knot tying and twine severing apparatus and a removable stop bar is secured to the housing for limiting the downward pivoting of the slack arm relative to the knot tying and twine severing apparatus.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION

Figure 1:
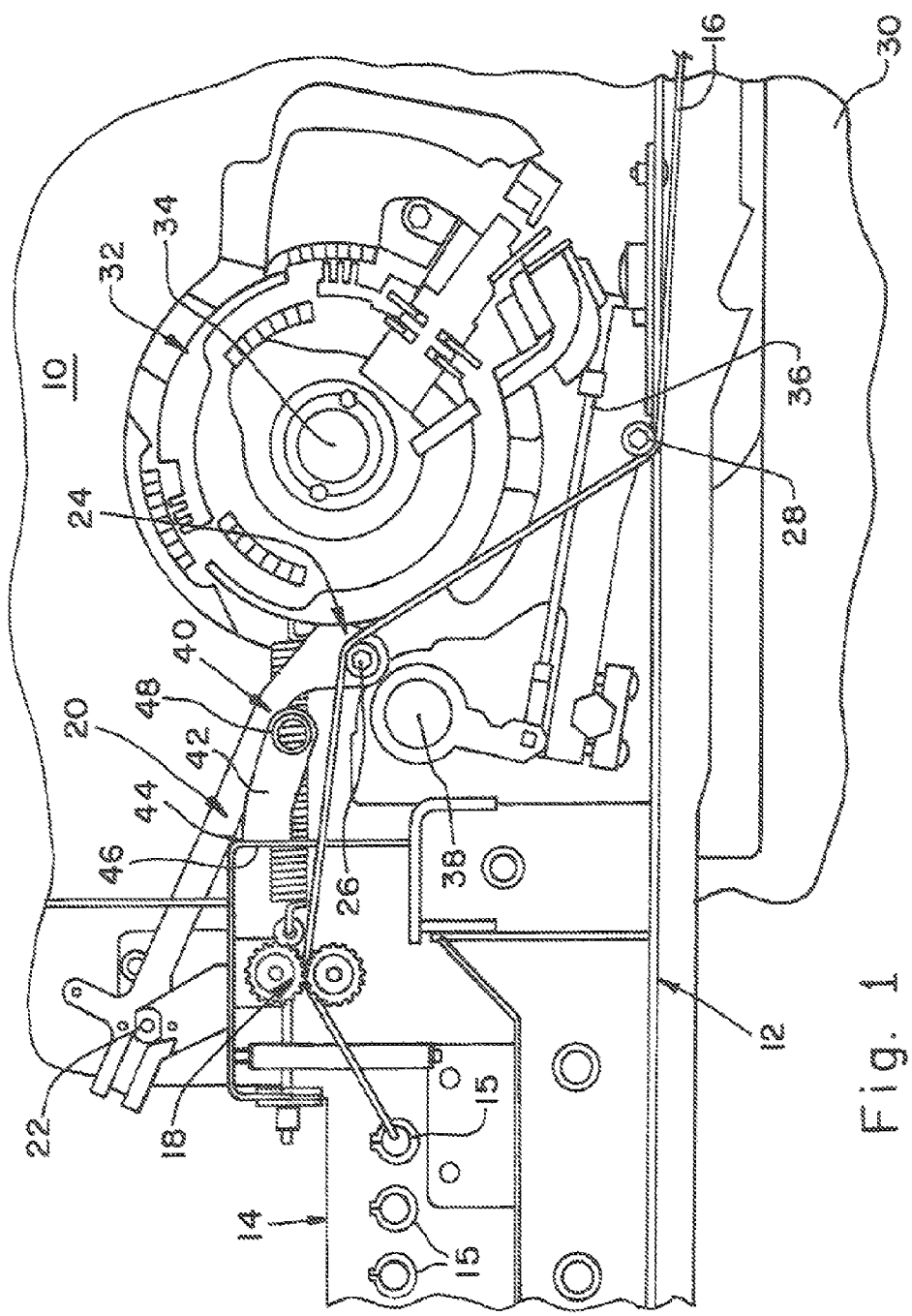
FIG. 1 is a side view of a twine tensioning system for a baler which embodies the present invention.

Referring now to the drawings, and more particularly to FIG. 1, there is illustrated a twine tensioning system 10 which is a part of an overall apparatus that traverses a field that gathers severed crop material for a bale chamber located below the illustrated twine tensioning system 10. Details of the mechanism for severing, gathering and compressing the bales are omitted to enable a clearer understanding of the present invention. Suffice to say the path of the bale produced in the baler is from left to right in FIG. 1. The tension system includes a housing 12 which is generally a sheet-like frame surrounding the mechanism and providing mounting for the fixed and articulated components of the assembly. Included outside the housing 12 is an appropriate storage space 14 for halls or twine. Twine balls are stored in twine boxes (not shown) on the side of the baler. As illustrated, there are multiple eyelets or twine guides 15, each for a separate length of twine 16 which is fed through the mechanism. Although three twine guides 15 are shown, it should be understood that any number may be employed. The storage space 14 holds twine 16 and the path of one of the lengths of twine 16 will be described, it being understood that for a plurality of twine there would be adjacent and multiple paths.

Upon entering the housing 12, the twine 16 first passes through a twine tensioner 18 which has also been developed over many years. Accordingly, the details of the twine tensioner are not described to simplify an understanding of the present invention. The tensioner 18 is positioned in the system so as to provide an appropriate amount of tension as the upper and lower lengths of twine 16 are carried by the forward edge of a bale through the machine. The twine 16 then passes through a slack arm 20 which is pivotally mounted to housing 12 at pivotal point 22 and has a remote end 24 journaling a guide illustrated in the form of a pulley 26 over which the twine 16 extends. However, other slack arm designs may have an eyelet on the end. From there, the twine 16 extends to a lower pulley 28 and along beneath the lower end of frame 12 and around a bale 30, a portion of which is illustrated.

Mounted within housing 12 is a knot tying and twine severing apparatus 32 which has a central rotational axis 34. As illustrated, the rotational axis 34 is positioned below the pivotal axis 22 of the slack arm 20. However, the rotational axis 34 does not need to be positioned beneath the pivotal axis 22. It may be inline with, or above pivotal axis 22, used on the knotter table layout. The knot tying and twine severing apparatus 32 also has been developed over the years and the details are omitted to gain clearer understanding of the present invention. Suffice to say that the mechanism 32 ties a knot between upper and lower lengths of twine 16 and generates two knots, one of which is at the forward end of the current bale 30 and the other of which is at the end of the next bale 30. A knife in the knotter (not shown) cuts the twine 18 to release the knot from the twine leading to the twine balls.

A tucker finger 36 is positioned within housing 12 and is mounted relative to a tucker finger shaft 38 positioned adjacent the knot tying and twine severing apparatus 32. The tucker finger shaft 38 in previous designs was utilized as a guide for twine so that twine would pass underneath the tucker finger shaft and then around the pulley 26 of the slack arm 20. Such a routing induced greater wear in the shaft itself and subsequent fraying of the twine.

Figure 2:
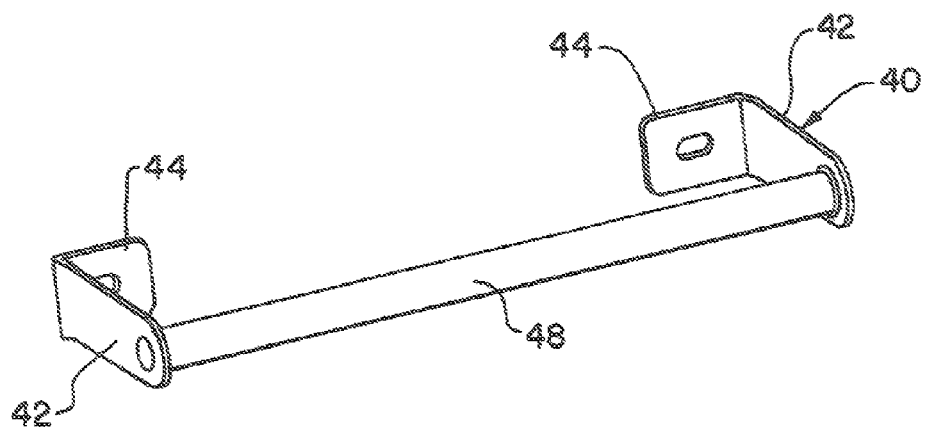
FIG. 2 is a perspective view of a stop bar incorporated in the twine tensioning apparatus of FIG. 1; and, FIG. 3 is a perspective view of an alternate stop bar incorporated in the twine tensioning apparatus of FIG. 1.

In accordance with the present invention, a stop bar 40 provides a less circuitous path and one in which minimal wear is induced on the tucker finger shaft 38. As illustrated particularly in FIG. 2, the stop bar 40 includes a pair of arms 42, each of which including a tab 44 and secured to housing 12 through removable fasteners 46. A tube 48 is mounted at the end of arms 42 and extends in a direction parallel to the pivotal, axis of stop arm 20.

Figure 3:
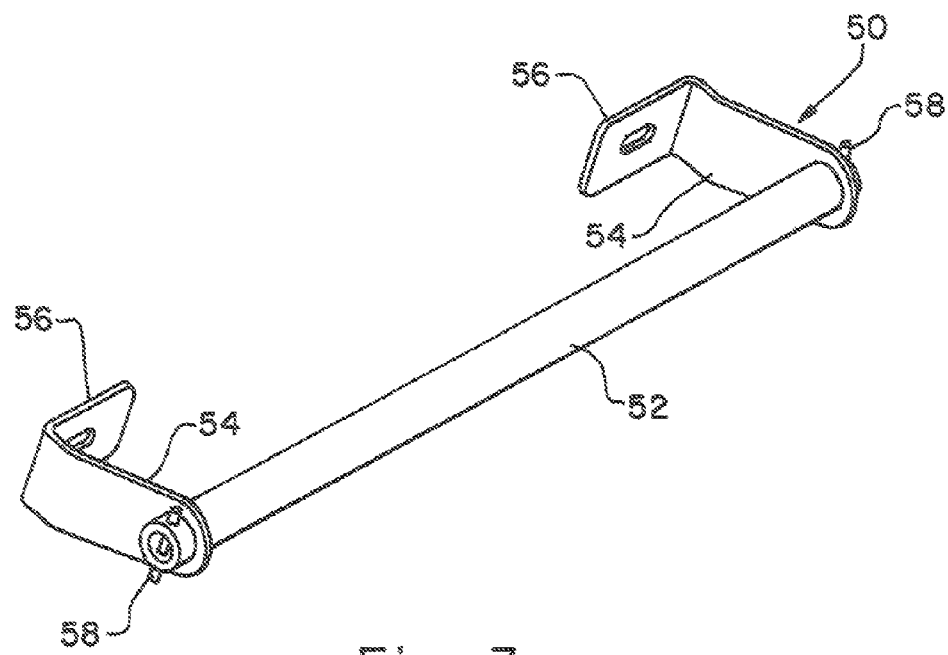

It should be apparent to those skilled in the art that the stop bar may have one continuous tube which could be fixed to the outer walls of housing 12. As shown in FIG. 3, the bar could also be allowed to rotate. A stop bar assembly 50 includes a tube 52 extending between and through spaced arms 54, each having a tab 56 for removable attachment to housing 12. The tube 52 is able to rotate relative to arms 54 and is held in place by pins 58.

Thus, the stop bar 40 or 50 acts as a stop for the slack arm which is essential for maintaining proper tension in the twine passed around the bale. The stop bar 40 or 50 is easily replaceable without complexity and may be done so on site.

In operation, the twine 16 extends through the tensioner 18, around the guide 26 and around the hale 30 when the bale 30 is being moved through the chamber and the twine path is in the position illustrated in FIG. 1 in which the slack arm is resting against the stop bar 40. The force required to pull twine 16 through the tensioner 18 is higher than the twine, force to bottom out the slack 20 arm on the stop bar 40. This ensures that the correct tension is maintained in the twine 16. It should be noted that the path for the twine 16 between the tensioner 18 and the guide 26 in the slack arm 20 is essentially a non-circuitous path which provides minimum wear for the twine 16. When the knotting process is being performed, the slack arm 20 pivots upward to maintain appropriate tension and in this position there is a circuitous path around the tube 44 of the stop bar 40 but the tension at that point in the cycle is greatly reduced which minimizes wear on the tube 40 and resultant fraying. It is important to have non-circuitous paths during the operation so that pressure on circuitous joints can be minimized. With the prior arrangement the rubbing part was greatly increased and with the substantially straight line path it is minimized with an accompanying reduction in wear.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A twine tensioning system for a baler comprising:
   a housing;
   a twine bin;
   a tensioner through which twine is fed;
   a slack arm pivotally mounted to said housing, said slack arm having a guide at an end remote from said pivotal connection for guiding twine;
   a knot tying and twine severing apparatus adjacent the remote end of said slack arm;
   a tucker finger positioned adjacent said knot tying and twine severing apparatus and pivotally mounted on a tucker finger shaft for periodically displacing twine into said knot tying and twine severing apparatus; and,
   said slack arm being mounted to said housing above said knot tying and twine severing apparatus and a stop bar removably secured to said housing for limiting the downward pivoting of said slack arm.

2. The twine tensioning system of claim 1, having a plurality of laterally spaced adjacent elements.

3. The twine tensioning system of claim 1, wherein said system is positioned on the top of a baling apparatus.

4. The twine tensioning system of claim 1, wherein said stop bar comprises a tube extending in a direction parallel to the pivotal axis of said slack arm and a arm extending from said bar and removably connected to said housing.

5. The twine tensioning system of claim 4, including a plurality of tensioning system and wherein said stop bar extends over adjacent tensioning systems.

6. The twine tensioning system of claim 5, having three adjacent tensioning systems and said bar extends between the adjacent slack arms.

7. The twine tensioning system of claim 1, wherein said guide on remote end of said slack arm is a pulley.

8. The tensioning system of claim 7, wherein the apparatus further includes a fixed pulley beneath said knot tying and twine severing apparatus through which said twine extends.

9. The twine tensioning apparatus of claim 1, having upper and lower twine tensioning systems and wherein said knot tying and severing apparatus connects twine from upper and lower positions.

10. The twine tensioning system of claim 4, wherein said stop bar is rotatable about its longitudinal axis.

* * * * *